(12) United States Patent
Mino et al.

(10) Patent No.: US 6,604,275 B1
(45) Date of Patent: Aug. 12, 2003

(54) METHOD OF MANUFACTURING THIN-FILM MAGNETIC HEAD

(75) Inventors: Tetsuya Mino, Chiba (JP); Yasufumi Uno, Nagano (JP); Koji Matsukuma, Hyogo (JP); Koichi Terunuma, Tokyo (JP); Masahiro Kondo, Chiba (JP)

(73) Assignee: TDK Corporation, Tokyo (JP)

( * ) Notice: Subject to any disclaimer, the term of this patent is extended or adjusted under 35 U.S.C. 154(b) by 229 days.

(21) Appl. No.: 09/702,865

(22) Filed: Nov. 1, 2000

Related U.S. Application Data

(62) Division of application No. 09/150,205, filed on Sep. 9, 1998, now Pat. No. 6,169,642.

(30) Foreign Application Priority Data

Oct. 15, 1997 (JP) .............................................. 9-296460

(51) Int. Cl.⁷ .......................... G11B 5/127; H04R 31/00
(52) U.S. Cl. ............................... 29/603.15; 29/603.16; 360/119; 360/126; 451/28
(58) Field of Search ........................ 29/603.07, 603.12, 29/603.15, 603.16, 603.23; 360/126, 128, 119; 451/5, 28

(56) References Cited

U.S. PATENT DOCUMENTS

| | | | |
|---|---|---|---|
| 5,283,942 A | 2/1994 | Chen et al. | 29/603 |
| 5,285,340 A | 2/1994 | Ju et al. | 360/119 |
| 5,452,164 A | 9/1995 | Cole et al. | 360/113 |
| 5,649,351 A | * 7/1997 | Cole et al. | 29/603.14 |
| 5,652,687 A | 7/1997 | Chen et al. | 360/126 |
| 5,699,605 A | * 12/1997 | Amin et al. | 29/603.14 |
| 5,719,730 A | 2/1998 | Chang et al. | 360/113 |
| 5,802,700 A | * 9/1998 | Chen et al. | 29/603.14 |
| 5,831,801 A | 11/1998 | Shouji et al. | 360/126 |
| 5,872,693 A | 2/1999 | Yoda et al. | 360/126 |

* cited by examiner

*Primary Examiner*—Peter Vo
*Assistant Examiner*—Donghai Nguyen
(74) *Attorney, Agent, or Firm*—Arent Fox Kintner Plotkin & Kahn, PLLC

(57) ABSTRACT

A method of manufacturing a thin-film magnetic head, includes the steps of: forming, on a lower auxiliary pole, a three-layer pole tip structure consisting of a lower pole tip element, a recording gap layer and an upper pole tip element; depositing a lower insulating layer on the three-layer pole tip structure; polishing the lower insulating layer by chemical-mechanical polishing so that a top surface of the lower insulating layer is leveled lower than a top of the three-layer pole tip structure over at least a region within which a coil conductor is formed; forming the coil conductor on the lower insulating layer; forming an upper insulating to cover the coil conductor; and forming an upper auxiliary pole so that a part of which contacts to the upper pole tip element.

5 Claims, 6 Drawing Sheets

METHOD OF MANUFACTURING THIN-FILM MAGNETIC HEAD

This is a Division of Application No. 09/150,205 filed Sep. 9. 1998, now U.S. Pat. No. 6,169,642. The disclosure of the prior application(s) is hereby incorporated by reference herein in its entirety.

FIELD OF THE INVENTION

The present invention relates to a thin-film magnetic head provided with at least an inductive recording transducer element and a method of manufacturing the head.

DESCRIPTION OF THE RELATED ART

Recently, demand for higher recording density has made a recording track width narrower, and therefore a submicron width of the pole of the recording head part has been needed. To cope with such narrower pole width, a thin-film magnetic head is formed in a manner that only the recording pole portion is separated from other portions. That is, a three-layer pole tip structure with a lower pole tip element, a recording gap layer and an upper pole tip element is formed at only a pole tip region located between an air bearing surface (ABS) and a position at a predetermined height from the ABS in the recording head part, and an upper yoke and a lower yoke are magnetically connected to the top surface and the bottom surface of this pole tip structure, respectively.

FIG. 1 is a schematic ABS view, illustrating an example of a conventional composite type thin-film magnetic head with an inductive recording head part and a magnetoresistive (MR) reproducing head part.

In the figure, the reference numeral 10 denotes a lower shield layer of the MR reproducing head part, 11 denotes an upper shield layer of the MR head part, which also acts as a lower auxiliary pole of an inductive recording head part, 12 denotes a MR layer provided through an insulating layer 13 between the lower shield layer 10 and the upper shield layer 11, 14 denotes a lower pole tip element of the inductive recording head part, 15 denotes an upper pole tip element, 16 denotes a recording gap layer formed between the lower and upper pole tip elements 14 and 15, 17 denotes an insulating layer deposited on the upper shield layer 11 and around a three-layer pole tip structure consisting of the lower pole tip element 14, the recording gap layer 16 and the upper pole tip element 15, and 18 denotes an upper auxiliary pole formed on the insulating layer 17 and deposited to contact with the upper pole tip element 15. The upper auxiliary pole 18 is magnetically connected with the lower auxiliary pole (upper shield layer) 11 at its rear portion so as to constitute a magnetic yoke together with the lower auxiliary pole 11.

The head with the three-layer pole tip structure shown in FIG. 1 can realize a narrower track width. However, peeling is liable to occur at the interface between the upper pole tip element 15 and the upper auxiliary pole 18 which are located at the trailing side and act an important role during recording. Also, since the three-layer pole structure has a narrow pole width of submicron, the magnetic domain, i.e. the easy magnetization axis, directs to a longitudinal direction of the poles causing the recording current to magnetic field conversion efficiency to lower.

FIG. 2 is a schematic ABS view illustrating another example of a conventional composite type thin-film magnetic head having a three-layer pole structure, described in U.S. Pat. No. 5,452,164, and FIG. 3 is a cross-sectional view perpendicular to the plane of the ABS, illustrating the example of FIG. 2.

In FIG. 2, the reference numeral 20 denotes a lower shield layer of the MR reproducing head part, 21 denotes an upper shield layer of the MR head part, which also acts as a lower auxiliary pole of an inductive recording head part, 22 denotes a MR layer provided through an insulating layer 23 between the lower shield layer 20 and the upper shield layer 21, 24 denotes a lower pole tip element of the inductive recording head part, 25 denotes an upper pole tip element, 26 denotes a recording gap layer formed between the lower and upper pole tip elements 24 and 25, 27 denotes a lower insulating layer deposited on the upper shield layer 21 and around a three-layer pole structure consisting of the lower pole tip element 24, the recording gap layer 26 and the upper pole tip element 25, 28 denotes an upper auxiliary pole, 29 denotes a coil conductor formed on the lower insulating layer 27, and 30 denotes an upper insulating layer covering the coil conductor 29, respectively. In this example, the three-layer pole tip structure protrudes from the upper surface of the lower insulating layer 27 at a region near the ABS. The upper auxiliary pole 28 is formed to cover the protruded portion of the upper pole tip element 25 of the pole tip structure. This upper auxiliary pole 28 is magnetically connected with the lower auxiliary pole (upper shield layer) 21 at its rear portion so as to constitute a magnetic yoke together with the lower auxiliary pole 21.

However, according to the conventional structure shown in FIGS. 2 and 3, the top of the lower insulating layer 27 at a region on which the coil conductor 29 is formed, which is far from the ABS, is formed so that it is certainly higher than the top of the three-layer pole tip structure. Thus, it is difficult to efficiently release heat generated by the recording current flowing through the coil conductor 29. In general, it is necessary that heat from the coil conductor 29 is released outward via a metal member to enhance the reliability of the magnetic head. However, because the upper auxiliary pole 28 has small volume, it is insufficient to radiate the heat. In addition, because the lower insulating layer 27 is thick at this region under the upper auxiliary pole 28, it is difficult to efficiently transmit the heat to the upper shield layer 21.

Furthermore, because of the aforementioned conventional structure in which height in the top of the upper pole tip element 15 is the same as that of the insulating layer 17, peeling often occurs at the interface between the upper pole tip element 15 and the upper auxiliary pole 18.

Also, the conventional method for manufacturing the three-layer pole tip structure shown in FIGS. 2 and 3 causes its fabricating processes to be very complicated.

SUMMARY OF THE INVENTION

It is therefore an object of the present invention to provide a thin-film magnetic head and a method of manufacturing the head, whereby decrease in reliability derived from generation of heat can be effectively prevented.

Another object of the present invention is to provide a thin-film magnetic head and a method of manufacturing the head, whereby peeling at the interface between the upper pole tip element and the upper auxiliary pole can be prevented.

Further object of the present invention is to provide a thin-film magnetic head and a method of manufacturing the head, whereby manufacturing processes can be simplified.

According to the present invention, a thin-film magnetic head having an air bearing surface, includes a three-layer pole tip structure consisting of a lower pole tip element, a recording gap layer and an upper pole tip element, the structure having side surfaces, a rear surface and top surface, a lower auxiliary pole, a part of which contacts to the lower pole tip element, an upper auxiliary pole, a part of which contacts to the upper pole tip element, the upper auxiliary pole being magnetically connected at its rear portion with respect to the air bearing surface to the lower auxiliary pole so as to form a yoke together with the lower auxiliary pole, a lower insulating layer, surrounding the side surfaces and the rear surfaces of the three-layer pole tip structure, the lower insulating layer being located between the lower and upper auxiliary poles and having a top surface, a coil conductor formed on the top surface of the lower insulating layer, and an upper insulating layer covering the coil conductor, a part of the upper insulating layer being located between the lower insulating layer and the upper auxiliary pole. The top surface of the lower insulating layer is leveled lower than the top surface of the three-layer pole tip structure over at least a region within which the coil conductor is formed.

Since the top surface of the lower insulating layer on which the coil conductor is formed is constructed in a level lower than the top surface of the upper pole tip element, the lower insulating layer itself can be made as a thin layer. As a result, heat generated from the coil conductor can be easily transmitted to the lower auxiliary pole arranged below the coil conductor. In particular, since the lower auxiliary pole has a large area and the lower insulating layer is made thin, the heat dispersion effects are increased, whereby generation of heat from a magnetic head can be effectively prevented.

It is preferred that the top surface of the lower insulating layer is formed in flat over its entire surface.

It is also preferred that the top surface of the lower insulating layer is leveled lower than the top surface of the three-layer pole tip structure over its entire surface.

It is preferred that a part of the upper pole tip element is protruded from the top surface of the lower insulating layer, and that the upper auxiliary pole is fixed to the part of the upper pole tip element so as to cover the part of the protruded upper pole tip element.

It is also preferred that a level difference between the top surface of the lower insulating layer adjacent to the three-layer pole tip structure and the top of the three-layer pole tip structure is 25 nm or more.

Preferably, the thin-film magnetic head is a composite type thin-film magnetic head with a MR reproducing head part having a lower shield layer, an upper shield layer and a MR layer formed between the lower and upper shield layers through an insulating layer, and the upper shield layer also acts as the lower auxiliary pole.

According to the present invention, also, a method of manufacturing a thin-film magnetic head includes the step of forming, on a lower auxiliary pole, a three-layer pole tip structure consisting of a lower pole tip element, a recording gap layer and an upper pole tip element, the step of depositing a lower insulating layer on the three-layer pole tip structure, the step of polishing the lower insulating layer by chemical-mechanical polishing (CMP) so that a top surface of the lower insulating layer is leveled lower than a top of the three-layer pole tip structure over at least a region within which a coil conductor is formed, the step of forming the coil conductor on the lower insulating layer, the step of forming an upper insulating layer to cover the coil conductor, and the step of forming an upper auxiliary pole so that a part of which contacts to the upper pole tip element.

After forming the lower insulating layer on a three-layer pole tip structure, this lower insulating layer is polished by a CMP process so that the top surface of the lower insulating layer is in a level lower than the top surface of the three-layer pole tip structure (the top surface of the upper pole tip element) over at least a region within which a coil conductor is formed. Thus, by only polishing using CMP process, the upper pole tip element of the three-layer pole tip structure is upward protruded from the lower insulating layer and the top surface of the lower insulating layer is in a level lower than the top surface of the three-layer pole tip structure over at least a region within which a coil conductor is formed, causing the manufacturing processes to be very simplified.

It is preferred that the polishing step includes the step of polishing so that the top surface of the lower insulating layer is formed in flat over its entire surface.

It is also preferred that the polishing step includes the step of polishing so that the top surface of the lower insulating layer is leveled lower than the top surface of the three-layer pole tip structure over its entire surface.

It is preferred that the polishing step includes the step of polishing so that a part of the upper pole tip element is protruded from the top surface of the lower insulating layer, and that the upper auxiliary pole forming step includes the step of forming the upper auxiliary pole to fix to the part of the upper pole tip element so as to cover the part of the protruded upper pole tip element.

Preferably, the method further includes the step of forming a lower shield layer, the step of forming a MR layer on the lower shield layer, and the step of forming an upper shield layer on the MR layer through an insulating layer, the upper shield layer acting also as the lower auxiliary pole.

Further objects and advantages of the present invention will be apparent from the following description of the preferred embodiments of the invention as illustrated in the accompanying drawings.

DESCRIPTION OF THE PREFERRED EMBODIMENTS

Figure 1:
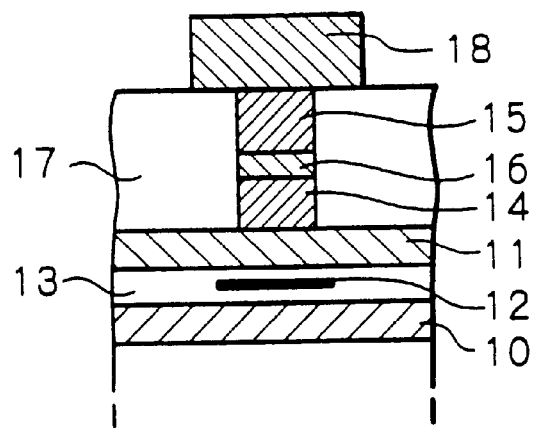
FIG. 1 is a schematic ABS view of the already described example of the conventional composite type thin-film magnetic head having a three-layer pole tip structure.
Figure 2:
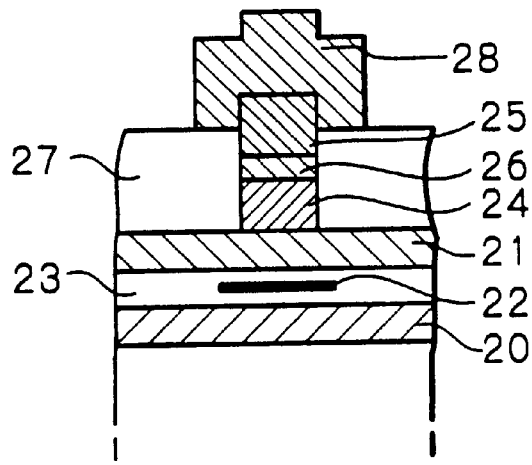
FIG. 2 is a schematic ABS view of the already described another example of the conventional composite type thin-film magnetic head having a three-layer pole tip structure.
Figure 3:
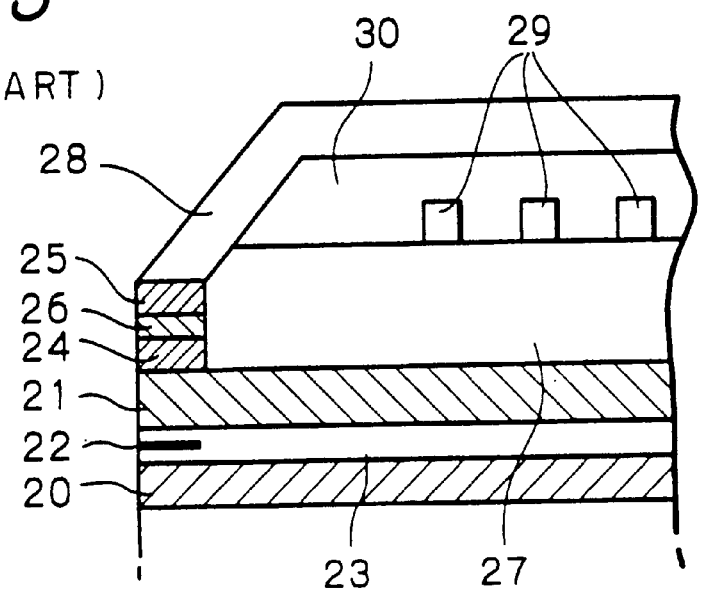
FIG. 3 is a cross-sectional view of the example of FIG. 2, perpendicular to the plane of the ABS.
Figure 4:
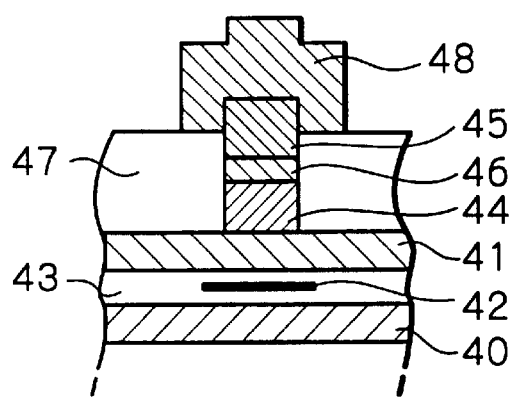
FIG. 4 is a schematic ABS view of a preferred embodiment of a composite type thin-film magnetic head having an inductive recording head part and a MR reproducing head part according to the present invention.
Figure 5:
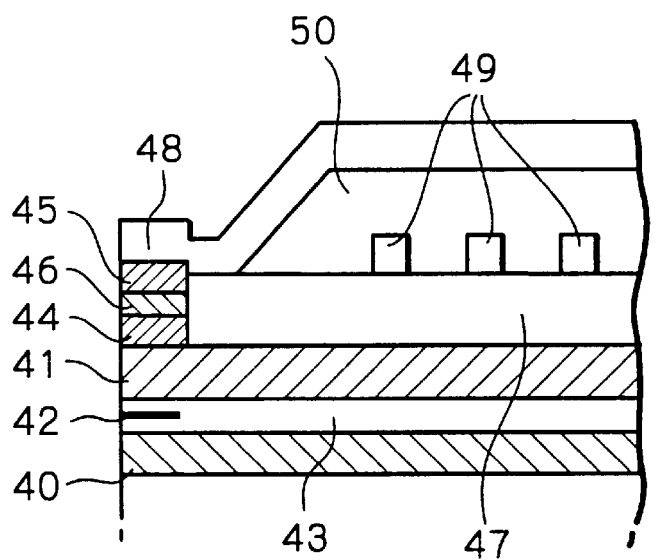
FIG. 5 is a cross-sectional view of the magnetic head of FIG. 4, perpendicular to the plane of the ABS.
Figure 6:
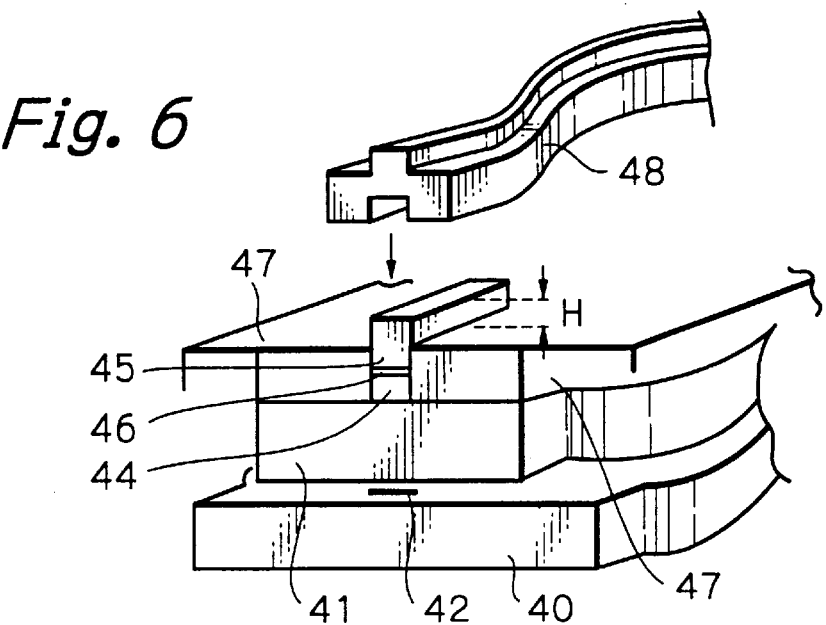
FIG. 6 is an exploded oblique view of the magnetic head of FIG. 4.

FIGS. 4 to 6 illustrate a preferred embodiment of a composite type thin-film magnetic head having an inductive recording head part and a MR reproducing head part according to the present invention. FIG. 4 is a schematic ABS view, FIG. 5 is a cross-sectional view perpendicular to the plane of the ABS, and FIG. 6 is an exploded oblique view.

In these figures, the reference numeral 40 denotes a lower shield layer for the MR reproducing head part, 41 denotes an upper shield layer, 42 denotes a MR layer formed between the lower and upper shield layers 40 and 41 through an insulating layer 43, 44 denotes a lower pole tip element of the inductive recording head part, 45 denotes an upper pole tip element, 46 denotes a recording gap layer formed between the lower and upper pole tip elements 44 and 45, and 47 denotes a lower insulating layer deposited on the upper shield layer 41 and around a three-layer pole tip structure consisting of the lower pole tip element 44, the recording gap layer 46 and the upper pole tip element 45. Furthermore, in the figures, the reference numeral 48 denotes an upper auxiliary pole, 49 denotes a coil conductor formed on the lower insulating layer 47, and 50 denotes an upper insulating layer deposited so as to cover the coil conductor 49, respectively. The upper shield layer 41 contacts to the lower pole tip element 44 to act as a lower auxiliary pole. The upper auxiliary pole 48 is magnetically connected with the lower auxiliary pole (upper shield layer) 41 at its rear portion so as to constitute a magnetic yoke together with the lower auxiliary pole 41.

In this embodiment, the top (upper surface) of the lower insulating layer 47 from the side of the upper pole tip element 45 to a region wherein the coil conductor 49 is formed is made flat, and the three-layer pole tip structure consisting of the lower pole tip element 44, the recording gap layer 46 and the upper pole tip element 45 is upward protruded from this flat top of the lower insulating layer 47. Namely, since the top of the lower insulating layer 47 on which the coil conductor 49 is formed is leveled, over its entire region, lower than the top of the upper pole tip element 45, the layer thickness of this lower insulating layer 47 can be thinner. As a result, heat generated from the coil conductor 49 can be easily transmitted to the upper shield layer (lower auxiliary pole) 41 through the insulating layer 47. In particular, since the upper shield layer 41 has a large area, the heat dispersion effects increases by making the lower insulating layer 47 thin, whereby generation of heat from the magnetic head can be effectively prevented.

Protruded height H of the upper pole tip element 45 from the top of the lower insulating layer 47 is 5 nm or more (H≧5 nm). The upper auxiliary pole 48 is formed to envelop the protruded portion of the upper pole tip element 45. Keeping of the protruded height as H≧5 nm will result the contact area between the upper pole tip element 45 and the upper auxiliary pole 48 to sufficiently increase, thereby enhancing adhesion and reducing peeling at the interface therebetween. Thus, according to the present invention, the product yield can be improced. The protruded height is, in considering the patterning process, preferably H=25 to 250 nm. Table 1 shows incidence of peeling failure depending upon the protruded height of the upper pole tip element 45 from the top of the lower insulating layer 47.

TABLE 1

| PROTRUDED HEIGHT H (nm) | INCIDENCE OF PEELING FAILURE (%) |
|---|---|
| 0 | 67.80 |
| 5 | 9.30 |
| 25 | 0.61 |
| 53 | 0.06 |
| 250 | 0.00 |
| 1400 | 0.00 |

In addition, according to the present invention, since magnetic coupling between the upper pole tip element 45 and the upper auxiliary pole 48 is strengthened, it is prevented that the magnetic domain (axis of easy magnetization) of the three-layer pole tip structure directs to a longitudinal direction of the pole. As a result, efficiency of recording current to magnetic field conversion can be maintained at a high level.

FIGS. 7 to 16 schematically illustrate a sequence of processes in the manufacturing method of the aforementioned composite type thin-film magnetic head according to the present invention.

Figure 7:
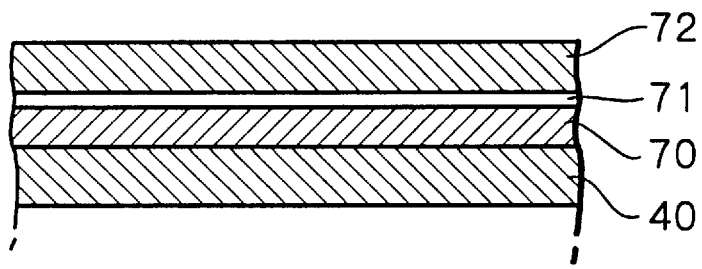
FIGS. 7 to 16 are schematic illustrations of a sequence of processes in the manufacturing method of the thin-film magnetic head according to the present invention.

As shown in FIG. 7, on a substrate or wafer (not shown), a MR reproducing head part with the lower shield layer 40, the MR layer, the insulating layer 43 and the upper shield layer 41 is first formed. After that, on the upper shield layer 41, a magnetic layer 70 for the lower pole tip element 44, an insulating layer 71 for the recording gap layer 46 and a recording layer 72 for the upper pole tip element 45 in the inductive recording head part are sequentially deposited.

In this embodiment, as the upper shield layer 41, about 3.5 μm thick NiFe (80 wt % Ni–20 wt % Fe) is formed by electroplating. As the lower and upper pole tip elements 44 and 45, the layers 70 and 72 made of a high Bs material such as FeZrN or FeN are deposited by sputtering to have a thickness of about 0.5 μm. In place of the high Bs material, NiFe may be used. As the recording gap layer 46, the insulating layer 71 made of an insulating material such as SiO$_2$ is deposited by sputtering to have a thickness of about 0.3 μm.

These three layers constituting the pole tip structure can be deposited in the same chamber. The sputtering conditions of each layer is shown in Table 2.

TABLE 2

|  | FeZrN | SiO$_2$ |
|---|---|---|
| RF/DC | DC | RF |
| APPLIED POWER (kW) | 1.40 | 0.90 |
| SPUTTERING PRESSURE (Pa) | 0.20 | 1.00 |
| SPUTTERING RATE (nm/min) | 11 | 2 |
| DISTANCE BETWEEN ELECTRODES (mm) | 130 | 130 |

Figure 8:
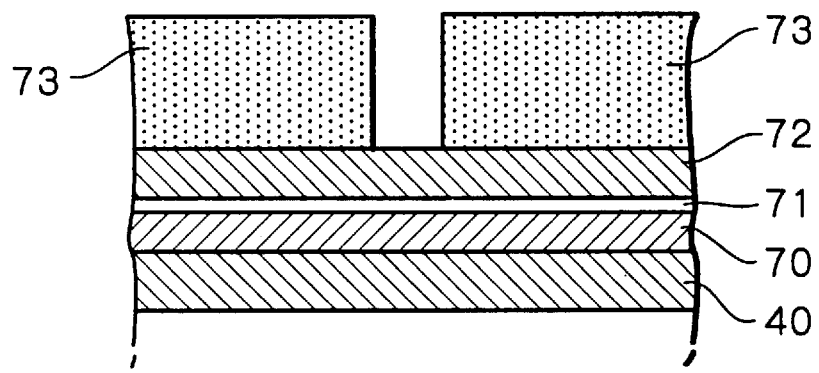

Then, as shown in FIG. 8, a resist frame 73 having an opening corresponding to a portion of a mask (74 shown in FIG. 9) to be formed is formed on the magnetic layer 72 for the upper pole tip element 45. The opening has a width of about 0.3 to 2.0 μm. In this embodiment, as the resist frame 73, a novolak type resist layer having a thickness of about 2 to 5 μm is deposited and then patterned by a photolithography technique.

Figure 9:
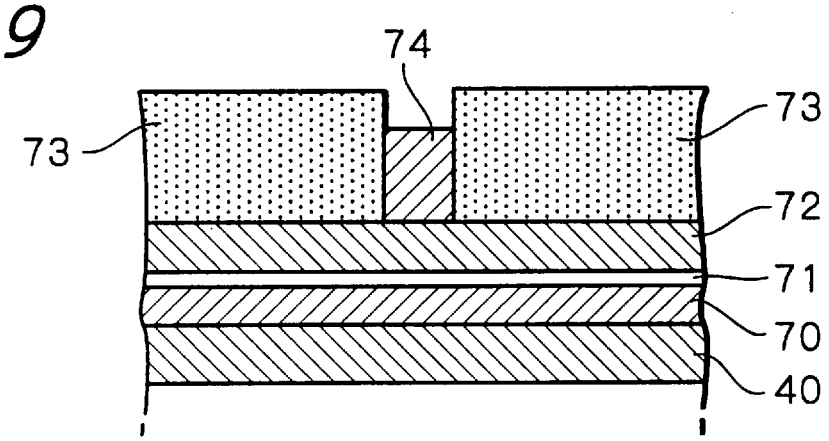

The mask 74 is then formed by electroless plating as shown in FIG. 9. It is desirable that before electroless plating, the wafer is immersed in 4.5% HCl solution for 1.5 min to obtain wetting properties of the plating surface.

The plated mask 74 is a metal compound composed of a base material of nickel (Ni) metal and cobalt (Co) metal, and additives of 3B group element such as boron (B) and 5B group element such as phosphorus (P). The thickness of the mask 74 is about 1.0 to 3.0 μm.

Figure 10:
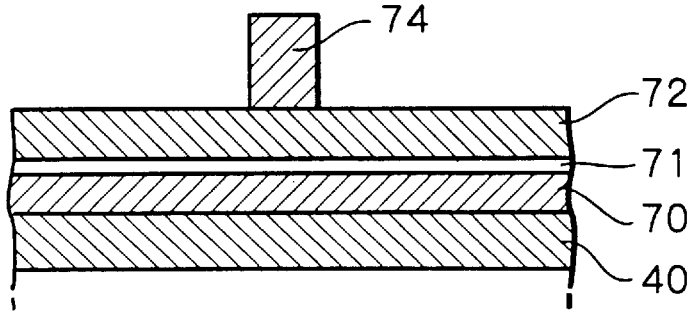

The resist frame 73 is then removed with acetone remover thereby obtaining a structure shown in FIG. 10.

Figure 11:
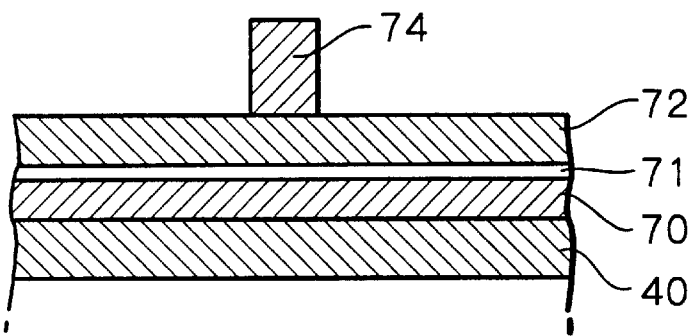
Figure 12:
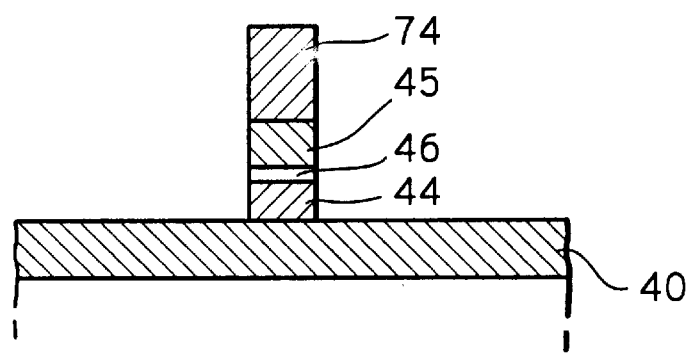

Then, the three layers 70, 71 and 72 are etched by ion milling using the mask 74 as shown in FIG. 11. The ion milling conditions are, for example, an accelerating voltage of 500 mV and an accelerating current of 400 mA. By this ion milling, the magnetic layer 70, insulating layer 71 and magnetic layer 72 except for an area below the mask 74 are removed to form the lower pole tip element 44, recording gap layer 46 and upper pole tip element 45 as shown in FIG. 12.

Figure 13:
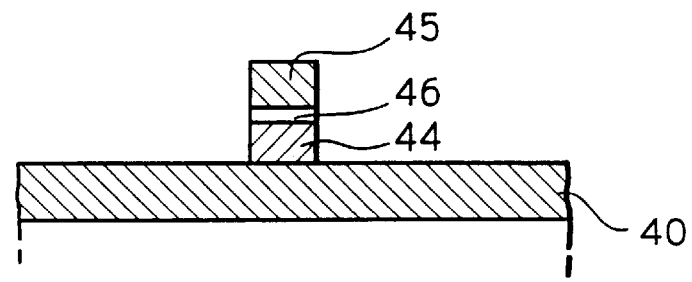

Then, the mask 74 is removed by means of some removing technique to provide a patterned three-layer pole structure consisting of the lower pole tip element 44, the recording gap layer 46 and the upper pole tip element 45, as shown in FIG. 13.

Figure 14:
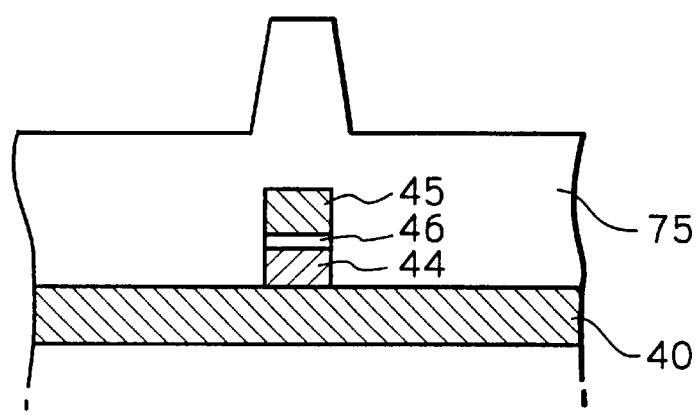

Then, as shown in FIG. 14, an insulating layer 75 consisting of an insulating material such as $Al_2O_3$ or $SiO_2$ is deposited by sputtering. The thickness of the insulating layer 75 is determined to a value such that the top of the three-layer pole tip structure formed by ion milling is fully buried in this layer 75, for example about 0.5 to 15 μm.

Figure 15:
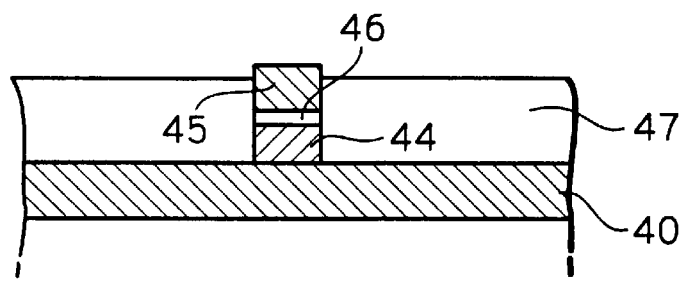

After depositing the insulating layer 75, this layer 75 is polished by a CMP process to expose the upper pole tip element 45, as shown in FIG. 15. The CMP in this embodiment is carried out using oxide abrasion grains such as $Al_2O_3$ or $SiO_2$, having each diameter of about 0.02 to 0.3 μm and alkaline slurry using KOH as additives. As a polishing pad, a synthetic fiber type such as urethane is used.

Even after the upper pole tip element 45 has been exposed, the polishing is still continued so that only the insulating layer 75 is selectively polished to flatten the top of the layer 75 and that the top portion of only a required height H of the upper pole tip element 45 is exposed from the top of the lower insulating layer 47, by suitably selecting conditions of the CMP process, such as pH, grain size etc. Alternatively, after exposing the upper pole tip element 45 by a CMP polishing process, the insulating layer 75 may be etched so that the top portion of only a required height H of the upper pole tip element 45 is exposed from the top of the lower insulating layer 47. However, the number of steps is increased in the latter case. In the etching process, an etchant such as NaOH by which only the insulating layer 75 will be further selectively etched than the upper pole tip element 45 is used. As mentioned above, by executing the CMP process, the top of the insulating layer 75 is flatted over a region located between the side of the upper pole tip element 45 and a position on which the coil conductor 49 is formed to form the lower insulating layer 47.

Then, as shown in FIG. 5, on the lower insulating layer 47 is formed the coil conductor 49 on which the upper insulating layer 50 is deposited. This upper insulating layer 50 is formed by depositing a novolak type photoresist and by patterning using a photolithography technique. In FIG. 5, the insulating layer 50 is formed so that its tip end of the ABS side is terminated at a position spaced from the rear end of the upper pole tip element 45. However, this layer 50 may be formed so that its tip end of the ABS side is terminated at the rear end of the upper pole tip element 45, or that its tip end of the ABS side covers at least a part of the upper pole tip element 45.

Figure 16:
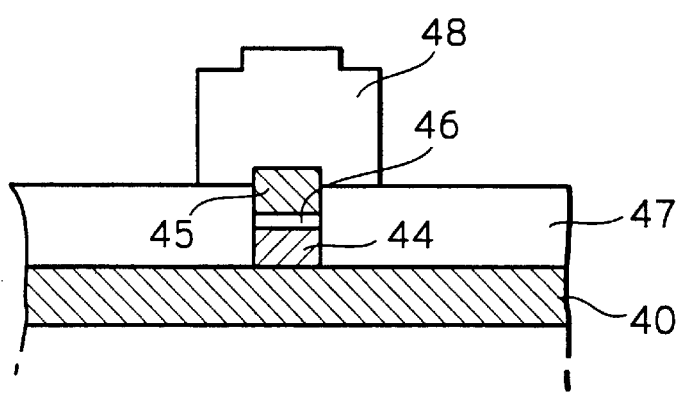

Then, as shown in FIG. 16, after forming a resist frame by a photolithography technique, the upper auxiliary pole 48 is formed by electroplating. This upper auxiliary pole 48 is formed so that it envelops a protruded portion of the upper pole tip element 45. Also, the upper auxiliary pole 48 is magnetically connected to the upper shield layer 41 at the rear portion so as to form a yoke. By the above-mentioned processes, the thin-film magnetic head having the cross-sectional view of FIG. 5 can be obtained.

Figure 17:
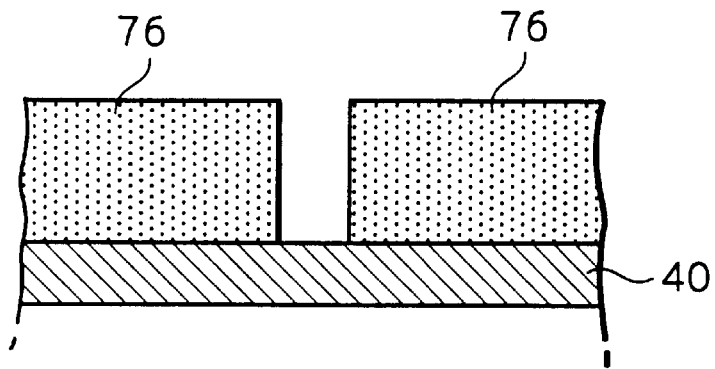
FIGS. 17 to 19 are schematic illustrations of another sequence of processes in the manufacturing method of the thin-film magnetic head according to the present invention.
Figure 18:
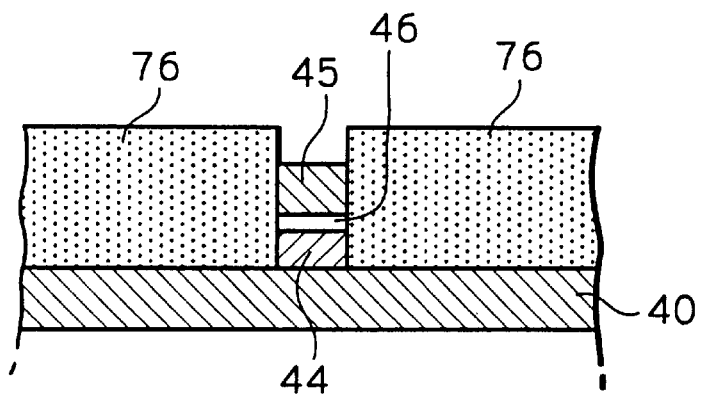
Figure 19:
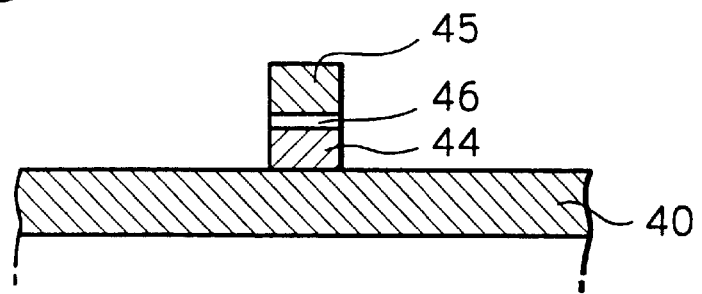

FIGS. 17 to 19 schematically illustrate another sequence of processes in the manufacturing method of the aforementioned composite type thin-film magnetic head according to the present invention.

As shown in FIG. 17, on a substrate or wafer (not shown), a MR reproducing head part is first formed. After that, on the upper shield layer 41, a resist frame 76 having an opening corresponding to a portion of the three-layer pole tip structure to be formed is formed. The opening has a width of about 0.3 to 2.0 μm. In this embodiment, as the resist frame 76, a novolak type resist layer having a thickness of about 2 to 5 μm is deposited and then patterned by a photolithography technique. Kind of the resist material and its thickness may be adequately selected in accordance with the width of the opening.

In this embodiment, also, the upper shield layer 40 is formed by a material such as NiFe (80 wt % Ni–20 wt % Fe) by using a photolithography technique and an electroplating process to have a thickness of about 3.5 μm.

Then, as shown in FIG. 18, the three-layer pole tip structure is formed by sequentially plating the lower pole tip element 44, the recording gap layer 46 and upper pole tip element 45. As the lower pole tip element 44, an about 0.5 μm thick NiFe series alloy thin-film is formed by electroplating. As the recording gap layer 46, a non-magnetic Ni series alloy thin-film is formed by electroless plating. The bath temperature and pH of the bath at electroless plating are 55° C. and 6.0 to 6.5, respectively. As the upper pole tip element 45, an about 0.5 μm thick NiFe series alloy thin-film is formed by electroplating as well as the lower pole tip element 44.

Then, by removing the resist frame using a remover such as acetone the patterned three-layer pole tip structure consisting of the lower pole tip element 44, recording gap layer 46 and upper pole tip element 45 is formed as shown in FIG. 19.

The following processes are the same as those of the former embodiment, shown in FIGS. 14 to 16.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of manufacturing a thin-film magnetic head, comprising the steps of:

forming, on a lower auxiliary pole, a three-layer pole tip structure consisting of a lower pole tip element, a recording gap layer and an upper pole tip element;

depositing a lower insulating layer on said three-layer pole tip structure such that the top of the three-layer pole tip structure is fully buried by said lower insulating layer;

polishing said lower insulating layer by chemical-mechanical polishing so that a top surface of said lower insulating layer is leveled lower than the top of said three-layer pole tip structure over a least a region within which a coil conductor is to be formed;

forming the coil conductor on said lower insulating layer;

forming an upper insulating layer to cover said coil conductor; and forming an upper auxiliary pole so that a part of which contacts to said upper pole tip element.

2. The method as claimed in claim 1, wherein said polishing step includes the step of polishing so that the top surface of said lower insulating layer is formed in flat over its entire surface.

3. The method as claimed in claim 1, wherein said polishing step includes the step of polishing so that the top surface of said lower insulating layer is leveled lower than the top surface of said three-layer pole tip structure over its entire surface.

4. The method as claimed in claim 1, wherein said polishing step includes the step of polishing so that a part of said upper pole tip element is protruded from the top surface of said lower insulating layer, and wherein said upper auxiliary pole forming step includes the step of forming the upper auxiliary pole to fix to and cover the part of said upper pole tip element that is protruded from the top surface of said lower insulating layer.

5. The method as claimed in claim 1, wherein said method further comprises the step of forming a lower shield layer, the step of forming a magnetoresistive layer on said lower shield layer, and the step of forming an upper shield layer on said magnetoresistive layer through an insulating layer, said upper shield layer acting also as the lower auxiliary pole.

* * * * *